June 6, 1933. A. WEISS Re. 18,856
ROTARY INTAGLIO PRINTING MACHINE
Original Filed Aug. 13, 1924 2 Sheets-Sheet 1
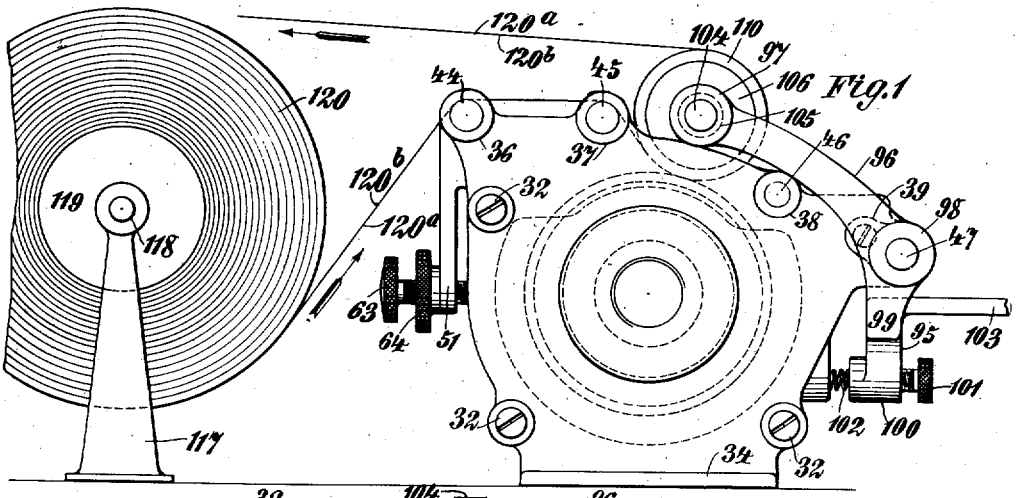
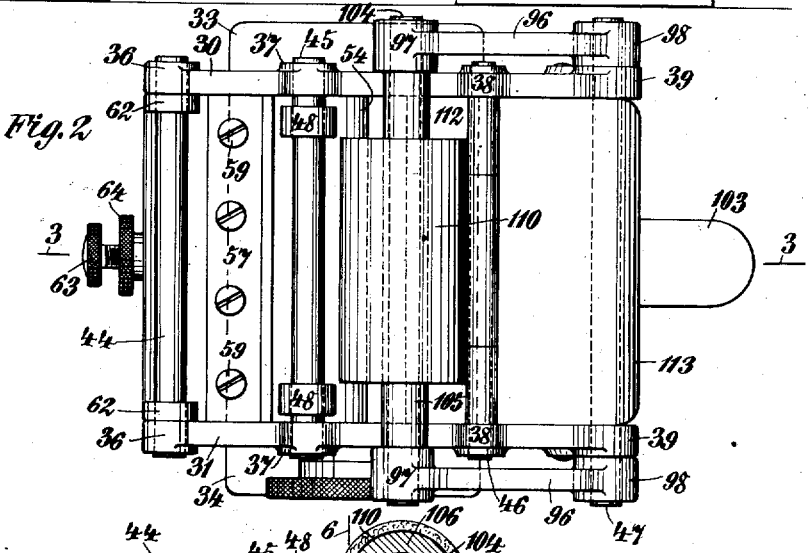
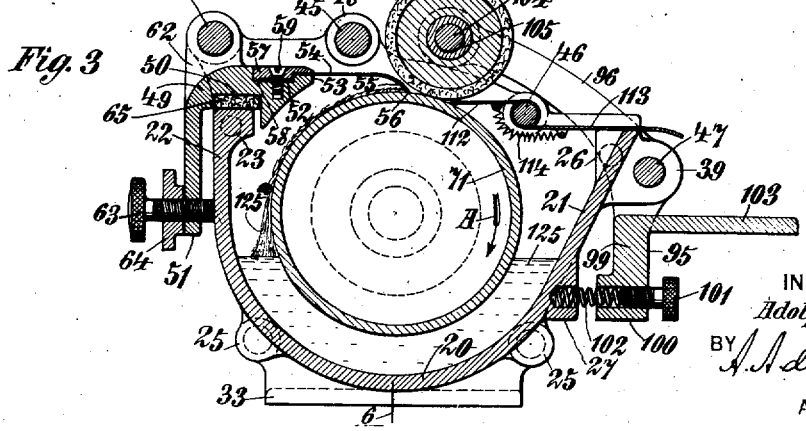
INVENTOR
Adolph Weiss.
BY A. A. de Bonneville
ATTORNEY.

June 6, 1933. A. WEISS Re. 18,856

ROTARY INTAGLIO PRINTING MACHINE

Original Filed Aug. 13, 1924 2 Sheets-Sheet 2

INVENTOR
Adolph Weiss.
BY A. A. de Bonneville
ATTORNEY

Reissued June 6, 1933 Re. 18,856

UNITED STATES PATENT OFFICE

ADOLPH WEISS, OF BROOKLYN, NEW YORK

ROTARY INTAGLIO PRINTING MACHINE

Original No. 1,631,169, dated June 7, 1927, Serial No. 731,858, filed August 13, 1924. Application for reissue filed September 10, 1932. Serial No. 632,624.

This invention relates to rotary intaglio printing machines.

Its object is the production of a printing machine, which preserves the ink used therewith, so that the machine can be used after long intervals of non-use. A second object of the invention is the production therewith of an air tight housing for the ink used. A third object of the invention is the production of a printing machine, which will prevent foreign matter mixing with the ink used. A fourth object of the invention is the production of a printing machine that will operate, without the necessity of the frequent cleaning of its direct printing elements. A fifth object of the invention is the production of a machine with a type of roller that will maintain its printing surface devoid of extraneous marks or indentations for a long period of time, and efficiently resist wear. A sixth object of the invention is the production of a rotary intaglio printing machine which is very simple in construction and of low first cost.

In the accompanying drawings,

Fig. 1 represents a side elevation of an exemplification of the improved rotary intaglio printing machine, with a reel;

Fig. 2 shows a top plan view of the printing machine;

Figure 4:
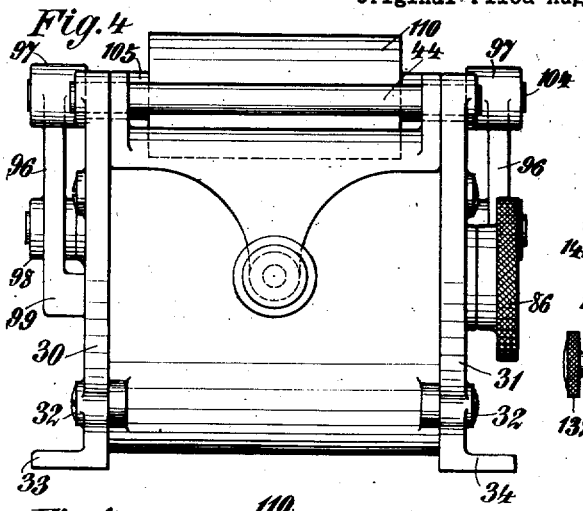
Figure 9:
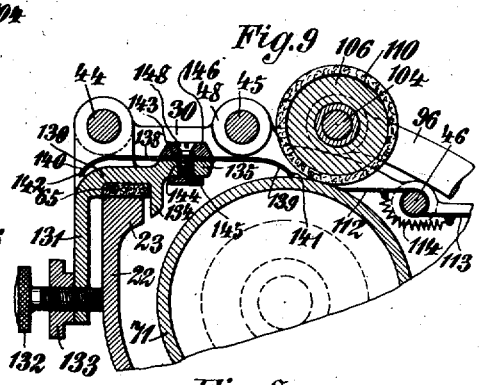
Figure 5:
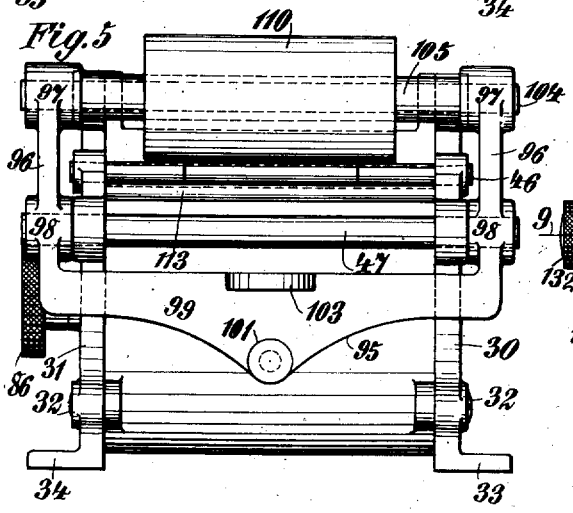
Figure 8:
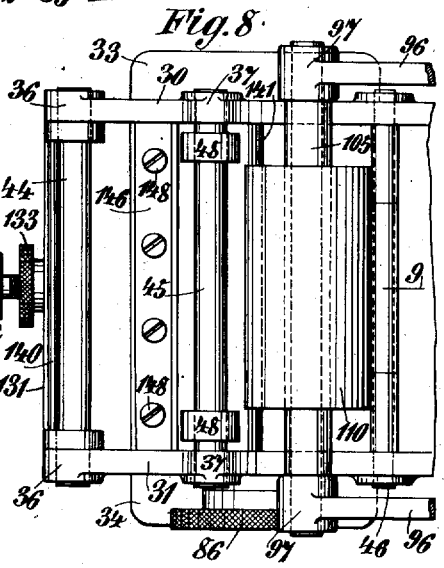
Figure 6:
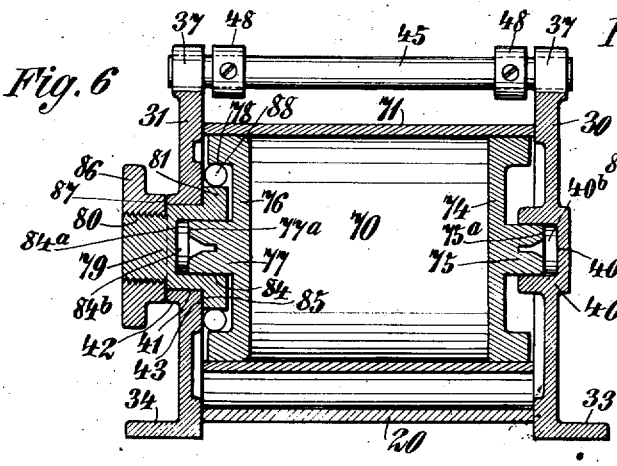
Figure 7:
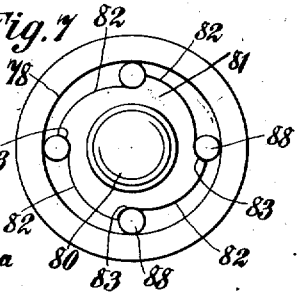

Fig. 3 indicates a section of Fig. 2 on the line 3, 3;

Fig. 4 shows a left-hand view of Fig. 2;

Fig. 5 represents a right-hand view of Fig. 2;

Fig. 6 indicates a section of Fig. 3 on the line 6, 6;

Fig. 7 indicates an elevation of some details;

Fig. 8 represents a fragmentary top plan view similar to Fig. 2 with a modification; and Fig. 9 shows a section of Fig. 8 on the line 9, 9.

The rotary intaglio printing machine is indicated with a housing, having the body portion with the rounded bottom 20 which joins with the inclined front wall 21, and the rear vertical wall 22 that terminates in the supporting heel 23. Lugs 25, 26 and 27 are formed with said body portion. Side walls 30 and 31 are detachably fastened to the body portion of the housing by means of the screws 32, which engage the threaded openings in the lugs 25, 26 and the supporting heel 23. Legs 33 and 34 are respectively formed with side walls 30 and 31. Brackets 36, 37, 38 and 39 are formed with the side walls 30 and 31. In the side wall 30 is formed the central journal bearing 40, with the end wall 40*a*, and in the side wall 31 is formed the central bearing 41 with the outer projection 42 and the inner bearing face 43. The brackets 36 support the shaft 44. The brackets 37 have journaled thereon the shaft 45. The brackets 38 support the hinge shaft 46. The brackets 39 support the shaft 47. The shaft 45 has adjustably fastened thereto gauging collars 48.

A doctor blade holder is indicated at 49 having the recess 50 and which has extending therefrom the apron 51, at right angles thereto. The holder 49 is recessed at 52 and has formed therewith the nose 53. The doctor blade 54 has formed therewith the bent end 55 with the outer bearing edge 56, which latter is shaped to exactly fit the surface of the shell 71 to be described, and the other end of the doctor blade is supported upon the top face of the nose 53. A clamp 57 is indicated with the heel 58 and is fastened to the holder 49, by means of the screws 59. The heel 58 bears on the top face of the recess 52 and the other end of said clamp 57 bears on the blade 54, opposite the top face of the nose 53 and thereby the said blade 54 is tightly secured in place. Journal lugs 62 extend from the holder 49 and are supported upon the shaft 44 by means of which the said holder 49 can swing on said shaft 44. The bent end 55 can bear on the etched shell 71. The lower end of the apron 51 is threaded for the adjusting screw 63, for which is provided the lock nut 64. An elastic strip of packing 65 is located upon the top face of the supporting heel 23 and enters the recess 50 of the blade holder 49. The function of the strip of packing 65 is to provide a seal for the housing of the printing machine, and prevents the entrance of air into and the exit of vapor from said housing. By means of the adjusting screw 63 the bearing edge of the bent end 55 of the doctor blade can be brought to bear with exactly the right pressure on the shell 71 of the printing cylinder to be now described.

The printing cylinder is indicated in its entirety by the numeral 70, and comprises the annular shell 71 of hardened steel, which is ground, lapped and etched with the letters, numerals, pictures or other configurations which are to be printed. The said etching extends into and below the outer cylindrical periphery of the shell 71 of the printing cylinder 70. A cup shaped head 74 with the journal end 75 having the end wall 75*a* is fastened to the shell 71 at one end thereof. The journal end 75 is rotatively supported in the bearing 40, and its end wall 75*a* is spaced from the wall 40*a* to form a cavity 40*b*. At the other end of the shell is fastened a similar cup shaped head 76 with the journal end 77 having the end wall 77*a*, and the inner circular wall 78. In the bearing 41 of the side wall 31 is rotatively supported a bushing 79 with the threaded end 80 and the flange 81 having the cam faces 82 with the heels 83. The bushing 79 has formed therewith the journal bearing 84 with the end wall 84*a* and the outer bearing face 85. The journal end 77 is journaled in the bearing 84 and its end wall 77*a* is spaced from the wall 84*a* to form a cavity 84*b*. The bearing face 85 functions with the inner bearing face 43 of the side wall 31 as a thrust bearing for the bushing 79. An auxiliary handle 86 is in threaded engagement with the threaded end 80 of the bushing 79, and its inner face 87 functions as a thrust bearing with the projection 42. The flange 81 extends into the cup of the head 76. Clutch balls 88 are located between the cam faces 81 and the inner circular wall 78 of the head 76.

A U-shaped frame is designated in its entirety by the numeral 95 and comprises the side members 96, which have each formed therein the bearings 97 and 98. A lower cross member 99 extends between the journal bearings 98, and has formed therewith the threaded boss 100, which has in threaded engagement therewith the adjusting screw 101. A compression spring 102 has one end thereof located in the opening of the boss 100 and its other end is supported in a cavity of the lug 27. An operating handle 103 extends from the cross member 99. The journal bearings 98 are rockingly supported on the shaft 47. In the bearings 97 is fastened the shaft 104, which has journaled thereto the metallic sleeve 105. A wooden core 106 is mounted upon the sleeve 105 and the latter in turn has fastened thereto a tubular shell 110 of elastic material. The combined construction of the sleeve 105, the core 106 and the shell 110 constitute the impression roller of the printing machine. By means of the spring 102 the said impression roller is brought to bear on the surface of the sheet of material to be described which bears on the shell 71 with the requisite pressure. The said pressure may be varied by the adjusting screw 101.

On the hinge shaft 46 is rockingly supported a shutter comprising the members 112 and 113. A tension spring 114 has one end fastened to the member 112 and its other end is fastened to the member 113. The outer end of the member 112 lightly bears on the shell 71 and functions as a means to prevent air and foreign matter discharged from the strip that is being printed entering the housing of the machine and adulterate the ink therein. The member 112 also prevents the escape of vapors from said ink. The member 113 bears on the top edge of the inclined wall 21 and functions as a door to fill the housing of the printing machine with ink. The member 113 also prevents entrance into said housing of air and foreign matter and prevents the escape of vapors therefrom.

A reel is indicated with stands like 117. The shaft 118 is supported in and fastened to said stands. A wooden core 119 is journaled on the shaft 118 and has wound thereon the web 120 having the outer face 120*a* and the inner face 120*b* on which the machine prints.

To operate the printing machine, ink 125 is poured into housing by lifting the shutter member 113. Next the doctor blade 54 is adjusted by means of the adjusting screw 63, and locked in position by means of the lock nut 64. The outer end of the web 120 is guided over the shafts 44 and 45. The gauge collars 48 are now located in proper position on the shaft 45 to guide the web 120 in proper position with respect to the etching on the shell 71. The impression roller having the tubular shell 110 is swung up, by bearing down on the operating handle 103, to enable the web 120 to be located between said impression roller and the printing cylinder 70. The impression roller is next released to bear upon the web 120, and the auxiliary handle 86 is turned in the direction of the arrow A (Fig. 3) to pull a sufficient length of the web 120 from between the impression roller and the printing cylinder 70 to be grasped. After the web is pulled from the printing machine it is cut, moistened, gummed or otherwise manipulated as required. During the pulling of the web the friction between it, the printing cylinder 70 and the impression roller, causes the said cylinder 70 to rotate in the housing in the direction of the arrow A. By this means a film of ink 125*a* is deposited on the surface of the shell 71. The surplus ink of the film is scraped from the unetched surface of the shell 71, by means of the bent end 55 of the doctor blade 54. The ink that remains deposited in the depressions on the shell 71 upon further rotation of said shell is printed upon the face 120*a* of the web 120. When the cylinder 70 is rotated by the pulling of the web 120, the clutch balls 88 are automatically carried toward the heels 83, and thereby the auxiliary handle 86 and the bushing 78 do not turn. Therefore the outer bearing face 85 of the flange 81 remains at rest and bears against the face 43 of the side wall 31 to prevent any leakage of ink from the housing at that point. The journal end 75 turns in the bearing 40 and the journal end 77 turns in the bearing 84 of the bushing 79. Between the ends 75 and 77 and their respective bearings 40 and 84 are formed cavities in which ink gathers, which functions as a lubricant. When the ink in the housing of the printing machine falls below the bottoms of said bearings, the ink remaining in the cavities of the bearings 40 and 84 still provides a lubricating medium for the journal ends 75 and 77. The ends of the shell 71 only bear against the inner faces of the side walls 30 and 31 at the upper portion of said walls, which prevent any lateral movement of the printing cylinder 70 and also practically seals said cylinder in the housing. The inner faces of the lower portions of the side walls 30 and 31 are spaced from the ends of the shell 71 as indicated in Fig. 6.

It will be noted that the side edges of the doctor blade holder 49, the packing strip 65, the clamp 57, the doctor blade 54, the shell 71 and the shutter members 112 and 113 bear against the adjoining faces of the side walls 30 and 31 to form an air tight closure therewith. The distance between the contact line of the bearing edge 56 of the bent end 55 of the doctor blade 54 and the line of tangency of the shell 71 and the impression roller is brought to a minimum, so that any exposed area of the cylinder with a film of ink between these lines will be the smallest possible. This disposition is essential because the film of ink on the shell 71 during the intervals that the machine is not operating is exposed to the air, will dry, and cause a gap in the printing produced on the web 120.

The printing cylinder 70 cannot be turned in a direction opposite to the arrow A, by reason of the coaction of the clutch balls 88 with the cam faces 82, and thereby no injury can result to the printing on the web 120.

The material of the doctor blade 54 is slightly softer than the material of the shell 71, so that any wear between these two elements will be of the doctor blade in preference to the shell. If the edge 56 of the blade 54 has been worn so as to produce a discoloring in the printing of the web 120, either a new doctor blade must be inserted or the edge 56 of the blade must be fitted to the shell 71.

Referring to Figs. 8 and 9 the housing is again indicated with the body portion having the rear vertical wall 22 with the supporting heel 23. The side walls are again indicated at 30 and 31. The U-shaped frame is again indicated with side members 96, which support the impression roller with the tubular shell 110. The printing cylinder is again indicated with the annular shell 71. The packing strip on the heel 23 is again indicated at 65.

The doctor blade holder 130 bears on the strip 65 and is shown with the apron 131 similar to 51, and the adjusting screw 132 with the lock nut 133 are similar to 63 and 64. The doctor blade holder has in this instance formed therewith the depending flange 134 and the projecting lug 135, which latter has an upper face slightly above the upper face of the body of the doctor blade holder 130. A doctor blade 138 is shown with the two bent ends 139 and 140, having the bearing edges 141 and 142 and the four holes 143. Four sleeves 144 each with a flange collar 145 extend through and are fastened in openings in the lug 135. Each sleeve has an interior thread. A clamping bar 146 bears on the doctor blade and has four openings that engage the sleeves 144. Screws 148 are in threaded engagement with the threads of the sleeves 144 and their heads bear down on the clamping bar 146. Either of the contact ends 141 and 142 of the doctor blade 138 are formed to exactly fit the shell 71 as described for the bearing end 56 of the doctor blade 54, by reversing the blade 138.

The doctor blade may be made without bent end.

Various modifications may be made in the invention and the present exemplification is to be taken as illustrative and not limitative thereof.

Having thus described my invention, what I claim as new and desire to secure by Letters Patent, is:

1. In a printing machine the combination of a housing for a printing fluid, a rotatable printing cylinder journaled in the housing and having configurations thereon formed by depressions extending below the outer surface thereof, a doctor blade for the machine with one end thereof bearing on the surface of the cylinder, an impression roller coacting with a web movably located between it and the periphery of the cylinder and means to maintain the housing air tight.

2. In a printing machine the combination of a housing for a printing fluid, a rotatable printing cylinder journaled in the housing having configurations thereon formed by depressions extending down and below the outer surface thereof, a doctor blade for the machine with one end thereof bearing on the cylinder and an impression roller coacting with a web between it and the cylinder and located so as to bring the contact line of the web upon the printing cylinder in close proximity to the contact line of the doctor blade upon the printing cylinder.

3. In a printing machine the combination of a housing for a printing fluid, a rotatable printing cylinder journaled in the housing and partly enclosed therein and having configurations thereon formed by depressions extending below the outer surface thereof, a doctor blade for the machine with the wiping edge thereof bearing on the surface of said cylinder, an impression roller coacting with a web movably located between it and the periphery of said cylinder, and means cooperating with said doctor and housing to provide therewith an air tight enclosure or housing about said enclosed cylinder portion.

4. In a printing machine the combination of a housing for a printing fluid, a rotatable printing cylinder journaled in the housing and partly enclosed therein and having configurations thereon formed by depressions extending below the outer surface thereof, a doctor blade for the machine with the wiping edge thereof bearing on the surface of said cylinder approximately at one of the peripheral extremities of the enclosed portion of said cylinder, an impression roller coacting with a web movably located between it and the periphery of said cylinder, and means cooperating with said doctor and housing to provide therewith an air tight enclosure or housing about said enclosed cylinder portion.

5. In a printing machine the combination of a housing for a printing fluid, a rotatable printing cylinder journaled in the housing and partly enclosed therein and having configurations thereon formed by depressions extending below the outer surface thereof, a doctor blade for the machine having the wiping edge thereof bearing on the surface of said cylinder, said doctor blade cooperating with said housing and cylinder to partly close said housing about said enclosed portion of said cylinder, an impression roller coacting with a web movably located between it and the periphery of said cylinder, and means cooperating with said doctor and housing to provide therewith an air tight enclosure or housing about said enclosed cylinder portion.

6. In a printing machine the combination of a housing for a printing fluid, a rotatable printing cylinder journaled in the housing with its major portion enclosed therein and having configurations thereon formed by depressions extending below the outer surface thereof, a doctor blade for the machine with the wiping edge thereof bearing on the surface of said cylinder approximately at one of the peripheral extremities of the enclosed portion of said cylinder, an impression roller coacting with a web movably located between it and the periphery of said cylinder, and means cooperating with said doctor and housing to provide therewith an air tight enclosure or housing about said enclosed major portion of said cylinder.

7. In a printing machine the combination of a housing for a printing fluid, a rotatable printing cylinder journaled in the housing with its major portion enclosed therein and having configurations thereon formed by depressions extending below the outer surface thereof, a doctor blade for the machine having the wiping edge thereof bearing on the surface of said cylinder, said doctor blade cooperating with said housing and cylinder to partly close said housing about said major portion of the printing cylinder, an impression roller coacting with a web movably located between it and the periphery of said cylinder, and means cooperating with said doctor and housing to provide therewith an air tight enclosure or housing about said enclosed major portion of said cylinder.

8. In a printing machine the combination of a housing for a printing fluid, a rotatable printing cylinder journaled in the housing and partly enclosed therein and having configurations thereon formed by depressions extending below the outer surface thereof, a doctor blade for the machine with the wiping edge thereof bearing on the surface of said cylinder approximately at one of the peripheral extremities of the enclosed portion of said cylinder, an impression roller coacting with a web movably located between it and the periphery of said cylinder, said impression roller being located so as to bring the contact line of the web upon said cylinder in close proximity to the contact line of the doctor blade upon said cylinder, and means cooperating with said doctor and housing to provide therewith an air tight enclosure or housing about said enclosed cylinder portion.

9. In a printing machine the combination of a housing for a printing fluid, a rotatable printing cylinder journaled in the housing and partly enclosed therein and having configurations thereon formed by depressions extending below the outer surface thereof, a doctor blade for the machine with the wiping edge thereof bearing on the surface of said cylinder and cooperating with said housing and cylinder to partly close said housing about said enclosed portion of said cylinder, an impression roller coacting with a web movably located between it and the periphery of said cylinder, said impression roller being located so as to bring the contact line of the web upon said cylinder in close proximity to the contact line of the doctor blade upon said cylinder, and means cooperating with said doctor and housing to provide therewith an air tight enclosure or housing about said enclosed cylinder portion.

10. In a printing machine the combination of a housing for a printing fluid, a rotatable printing cylinder journaled in the housing with its major portion enclosed therein and having configurations thereon formed by depressions extending below the outer surface thereof, a doctor blade for the machine with the wiping edge thereof bearing on the surface of said cylinder approximately at one of the peripheral extremities of the enclosed portion of said cylinder, an impression roller coacting with a web movably located between it and the periphery of said cylinder, said impression roller being located so as to bring the contact line of the web upon said cylinder in close proximity to the contact line of the doctor blade upon said cylinder, and means cooperating with said doctor and housing to provide therewith an air tight enclosure or housing about said enclosed major portion of said cylinder.

11. In a printing machine the combination of a housing for a printing fluid, a rotatable printing cylinder journaled in the housing with its major portion enclosed therein and having configurations thereon formed by depressions extending below the outer surface thereof, a doctor blade for the machine with the wiping edge thereof bearing on the surface of said cylinder, an impression roller coacting with a web movably located between it and the periphery of said cylinder, said impression roller being located so as to bring the contact line of the web upon said cylinder in close proximity to that one of the peripheral extremities of the enclosed portion of said cylinder which is rotatively in advance of said roller, and means cooperating with said doctor and housing to provide therewith an air tight enclosure or housing about said enclosed major portion of said cylinder.

12. In a printing machine the combination of a housing for a printing fluid, a rotatable printing cylinder journaled in the housing having configurations thereon formed by a depressions extending down and below the outer surface thereof, a doctor blade for the machine with one end thereof bearing on the cylinder, an impression roller coacting with a web between it and the cylinder, the said printing cylinder and impression roller simultaneously rotated by moving said web and means to maintain the housing air tight.

13. In a printing machine the combination of a housing for a printing fluid, a rotatable printing cylinder of hardened metal journaled in the housing and having configurations thereon formed by depressions extending below the outer surface thereof, a doctor blade for the machine with one end thereof bearing on the surface of the cylinder, an impression roller coacting with a web movably located between it and the periphery of the cylinder and means to maintain the housing air tight.

14. In a printing machine the combination of a housing for a printing fluid, a rotatable printing cylinder journaled in the housing and having configurations thereon formed by depressions extending below the outer periphery thereof, a doctor blade with a bent end having a bearing edge, pivoted in the housing, said edge bearing on the surface of the printing cylinder and an impression roller for the machine coacting with a web movably located between it and the periphery of the printing cylinder.

15. In a printing machine the combination of a housing for a printing fluid, a rotatable printing cylinder journaled in the housing and having configurations thereon formed by depressions extending below the outer periphery thereof, a doctor blade for the machine having a bearing edge, said doctor blade adapted to swing only in a vertical plane to bring its bearing edge on the periphery of the printing cylinder, an impression roller coacting with a web to be printed on movably located between its periphery and the periphery of the printing cylinder and means to maintain the housing air tight.

16. In a printing machine the combination of a housing for a printing fluid, a rotatable printing cylinder journaled in the housing and having configurations thereon formed by depressions extending below the outer periphery thereof, a doctor blade for the machine with one end thereof bearing on the surface of the printing cylinder, means to adjust the pressure between the end of the doctor blade and the surface of the printing cylinder, an impression roller for the machine coacting with a web movably located between it and the periphery of the printing cylinder and means to maintain said housing air tight.

17. In a printing machine the combination of a housing for a printing fluid, a rotatable printing cylinder journaled in the housing and having configurations thereon, a doctor blade holder pivoted in the housing and having a nose at one end and an apron on the other end, a doctor blade with one end detachably connected to said nose and its other end normally bearing on the periphery of the rotatable printing cylinder and an adjusting screw in threaded engagement with said apron and its end adapted to bear against said housing to adjust the pressure between the periphery of the printing cylinder and the end of the doctor blade bearing thereon.

18. In a printing machine the combination of a housing for a printing fluid, an elastic strip of packing located upon the upper end of one of the walls of the housing, a pair of brackets extending up from the housing, a shaft with its ends fastened to said brackets, a doctor blade holder with a pair of journal lugs, said lugs rockingly supported on said shaft, said doctor blade holder having formed at one end thereof a nose and an apron on its other end, an adjusting screw in threaded engagement with said apron and adapted to bear against a wall of said housing, a printing cylinder journaled in said housing, a doctor blade for said holder having a bent end with a bearing edge adapted to bear on the printing cylinder, the other end of the doctor blade supported on said holder, a clamp detachably connected to said holder clamping one end of the doctor blade and an impression roller pivoted to the housing for a web to be printed on located between it and the printing cylinder, said printing cylinder printing on said web when pulled to move between it and said impression roller.

19. In a printing machine the combination of a housing with a rear wall and a front wall for a printing fluid, a rotatable printing cylinder journaled in the housing, a rotatable impression roller pivoted to the housing, coacting with a movable web located between it and the printing cylinder, a doctor blade holder pivoted to the housing, a doctor blade detachably connected to said holder and having a bearing edge contacting with the printing cylinder adjacent to said impression roller, a shaft with its ends supported in the side walls of the housing, a shutter comprising a pair of members hinged to said shaft, the swinging end of one of said members bearing on the printing cylinder adjacent to the bearing edge of the doctor blade, the swinging end of the other member of the shutter bearing on the top edge of the front wall of the housing, and a spring with one end thereof connected to one of the members of the shutter and its other end connected to the other member of the shutter, said doctor blade holder with its doctor blade and said shutter forming an air tight seal with said housing.

20. In a printing machine of the character described, the combination of a housing comprising a body portion with a front wall and a rear wall, a printing cylinder journaled in the body portion of said housing, a doctor blade holder pivoted to and above the rear wall of said housing, means to adjust the blade holder in different positions, a doctor blade with one end fastened to said doctor blade holder and its other end bearing on the printing cylinder, a U-shaped frame pivoted to the front wall of the body portion of said housing, an impression roller journaled in one end of said frame, an adjusting screw in threaded engagement with the other end of said frame and a spring bearing between the front wall of the body portion of the housing and the tip end of said screw, said screw adjusting the pressure on a web to be printed upon movably located between the periphery of the printing cylinder and said impression roller.

21. In a printing machine the combination of a housing having a bottom, a front wall and a rear wall, side walls connected to said bottom, front and rear walls, a printing cylinder in said housing, said cylinder comprising a shell, heads supporting said shell in journaled relation to said side walls, said side walls at their upper portions in contact with the ends of said shell, and their lower portions spaced therefrom, a doctor blade holder adjustably supported upon the rear wall of the housing, a doctor blade with one end connected to the said doctor blade holder and its other end bearing on the shell of the printing cylinder, a hinge shaft having its ends supported in said side walls, a shutter comprising a pair of members with one end of each supported on said hinge shaft, the swinging end of one member of the shutter bearing on said shell and the swinging end of the other member bearing on the front wall of the housing, the combination of the elements constituting an air tight housing, and an impression roller in pivotal relation to said housing and adapted to bear on a web movably located between it and the shell of the printing cylinder, adjacent to the swinging end of the doctor blade.

22. In a printing machine the combination of a housing with a body portion having a front wall and a rear wall, a bottom portion connecting said walls, side walls for said body portion, one of said side walls having a journal bearing extending from its inner face, an element connected to the other side wall with a journal bearing extending into the said housing, a printing cylinder in said housing and having journal ends extending from its sides journaled in said journal bearings and a clutch mechanism coacting with said element whereby the printing cylinder is locked from turning in one direction.

23. In a printing machine the combination of a housing with a body portion, side walls for said body portion, one of said side walls having a journal bearing extending from its inner face, a bushing detachably connected to the other side wall and having a journal bearing formed therewith extending into said housing, a printing cylinder in said housing, a head for one end of said printing cylinder having a journal end extending therefrom journaled in the journal bearing of one of said side walls, a bushing seated in a central bearing in the other side wall of the housing, said bushing having at one end a journal bearing formed therewith and having a flange extending therefrom with cam faces on its periphery, a handle for the other end of the bushing, a cup shaped head for the other end of the cylinder having a journal end and an inner circular wall, the journal end of the cup shaped head seated in the journal bearing of the bushing, and clutch balls interposed between said cam faces and said inner circular wall of the cup shaped head.

24. In a printing machine the combination of a housing with a body portion for fluid ink, side walls for said body portion and connected thereto, one of said side walls having a journal bearing with an end wall, said journal bearing extending into said housing, a bushing connected to the other side wall of the housing, having a journal bearing with an end wall extending into the housing, a printing cylinder in said housing having journal ends, said journal ends journaled in said journal bearings, and their end walls spaced from the end walls of said journal bearings to form cavities for the collection of portions of the fluid ink from said housing to lubricate the bearing ends of the cylinder.

25. In a printing machine the combination of a housing for a printing fluid, a printing cylinder journaled in the housing, a doctor blade holder pivoted to the housing, a doctor blade fastened to the holder, an impression roller pivoted to the housing coacting with a web interposed between it and the printing cylinder, said web when pulled turning both the printing cylinder and the impression roller, and means to manually turn the printing cylinder in the same direction only as turned by the effect of pulling the web.

26. In a printing machine the combination of a housing for a printing fluid, a printing cylinder journaled in the housing, a pivotal doctor blade with one end thereof bearing on the printing cylinder, an impression roller pivoted to the housing coacting with a web interposed between it and the printing cylinder, the printing cylinder normally turning with the movement of the web, and auxiliary means to turn the cylinder in the same direction only as effected by pulling the said web, said means remaining stationary when the printing cylinder is moved by the web.

In testimony whereof, I have signed my name to this specification.

ADOLPH WEISS.